Dec. 5, 1950  E. L. ROSE  2,532,424
ROTARY PLOW
Filed April 30, 1945  6 Sheets-Sheet 1
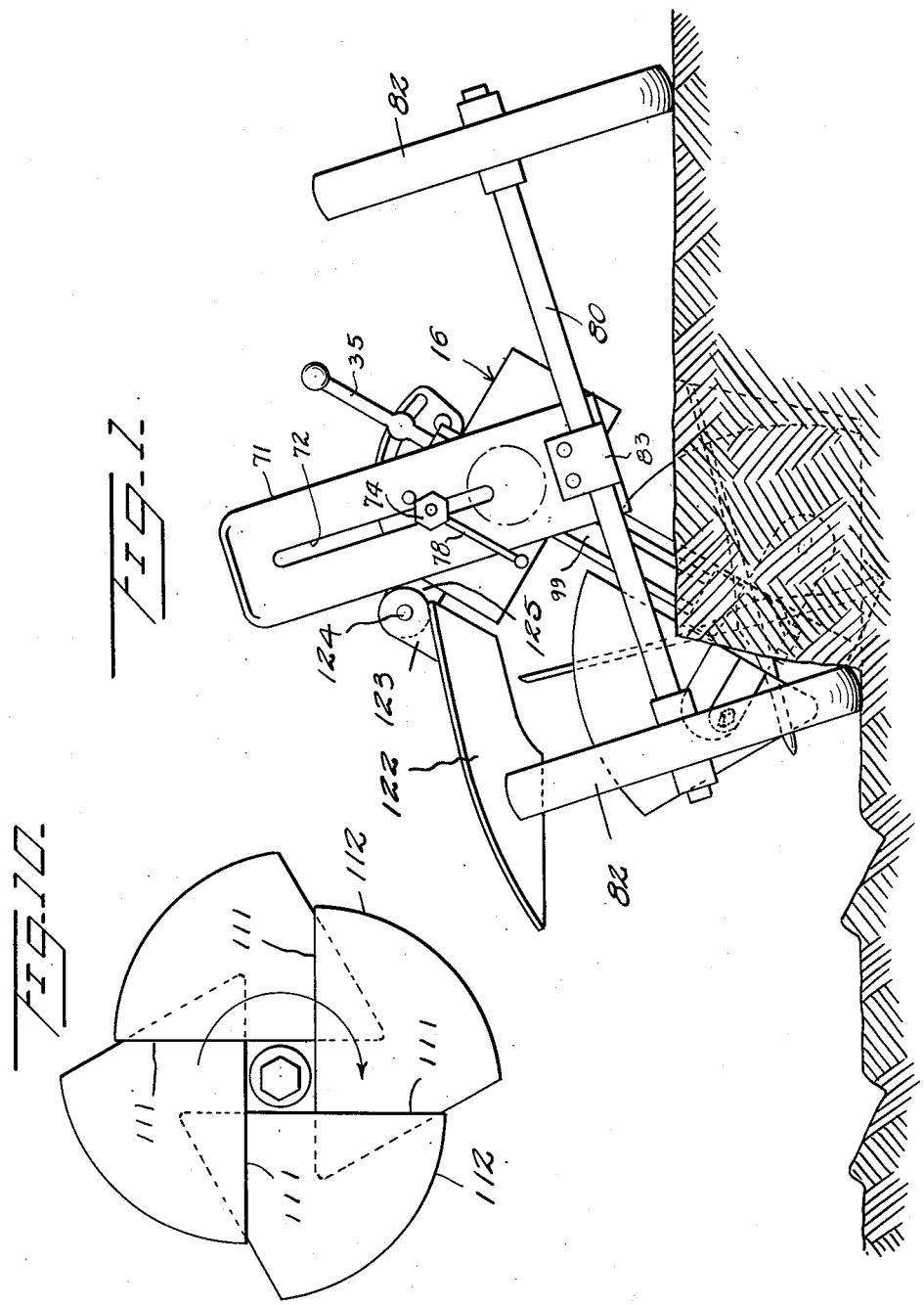
INVENTOR.
E. L. Rose
BY
Kimmel & Crowell attys.

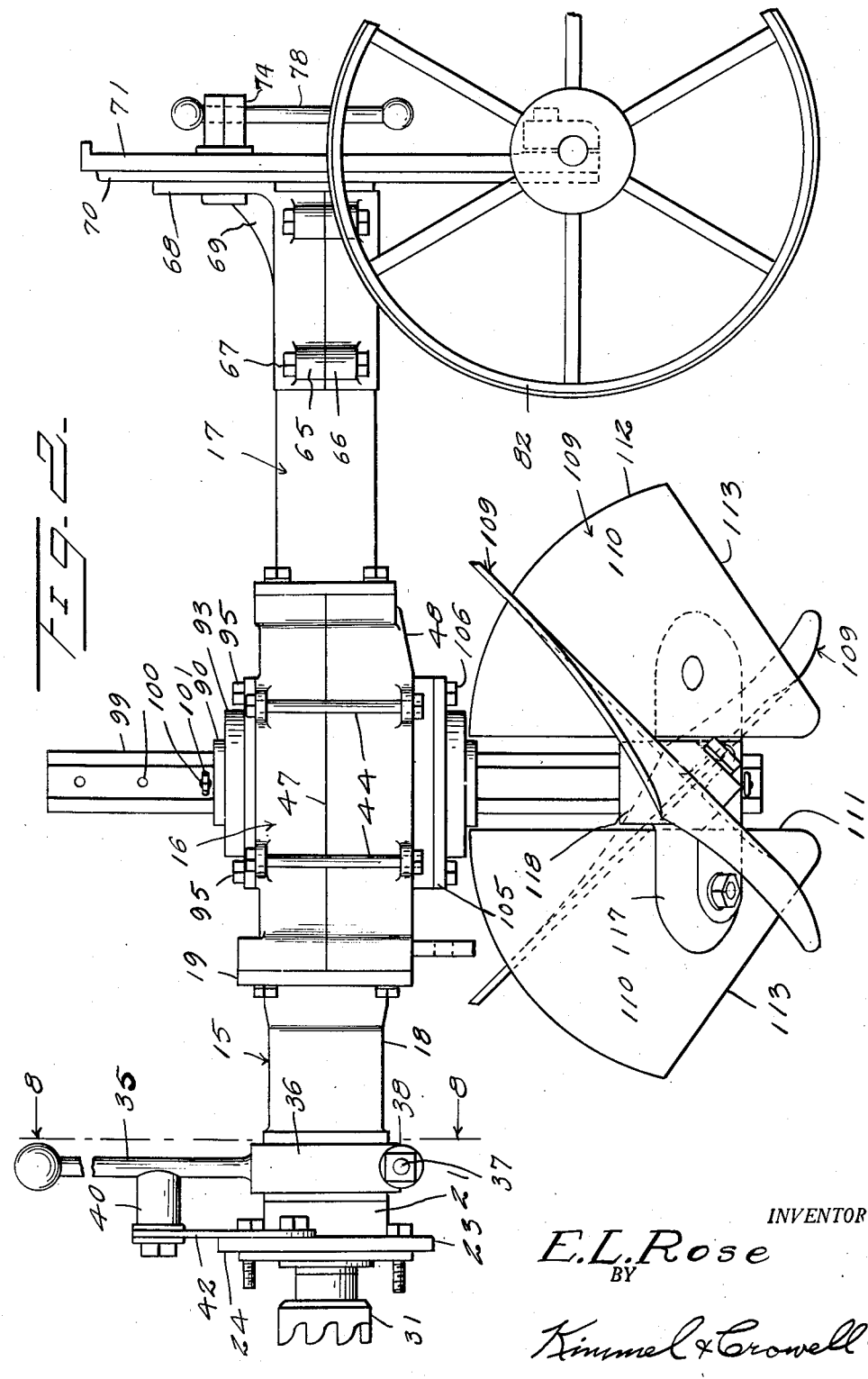

Dec. 5, 1950 E. L. ROSE 2,532,424
ROTARY PLOW
Filed April 30, 1945 6 Sheets-Sheet 3
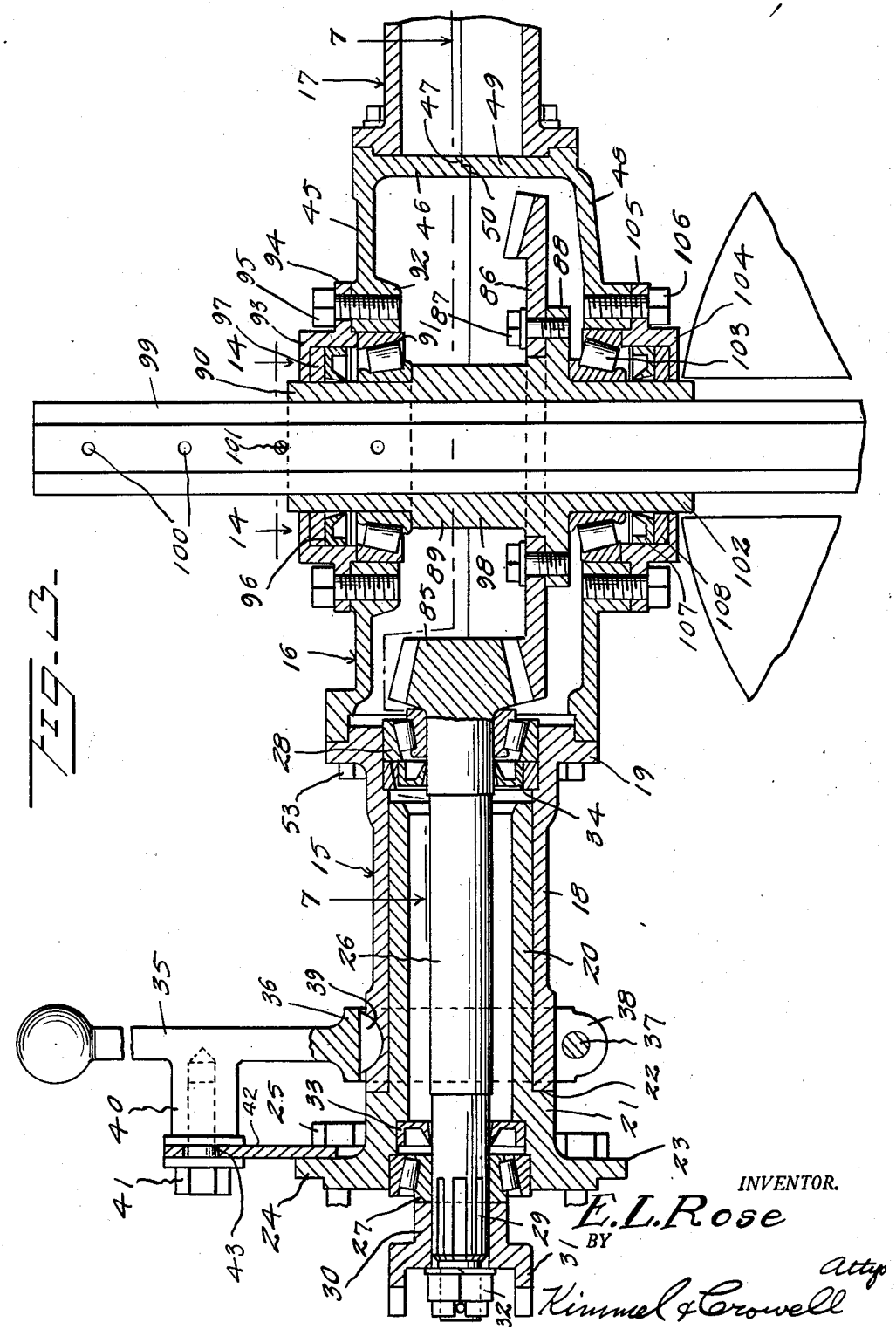
INVENTOR.
E. L. Rose
BY
Kimmel & Crowell
Attys

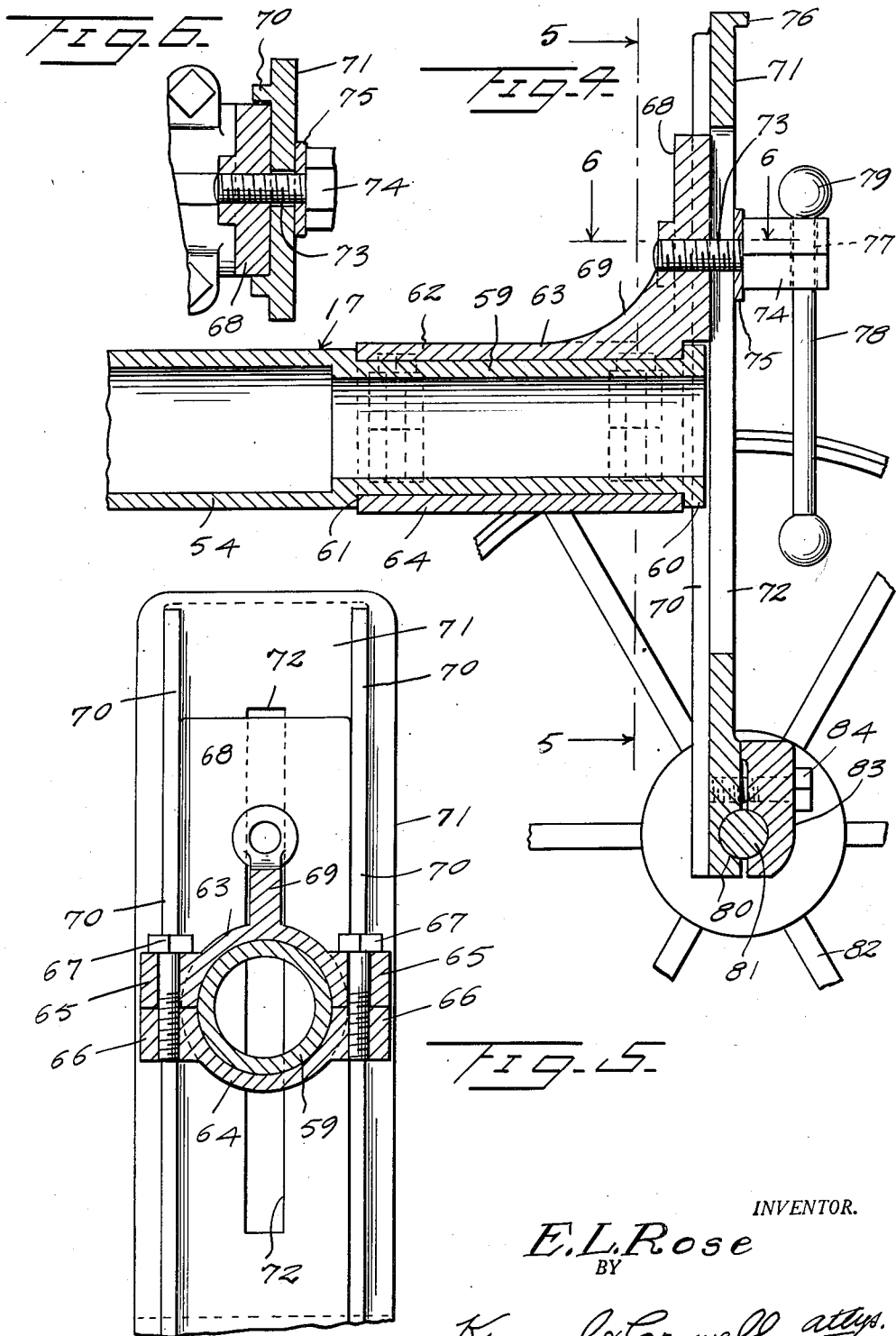

Dec. 5, 1950  E. L. ROSE  2,532,424
ROTARY PLOW
Filed April 30, 1945  6 Sheets-Sheet 5
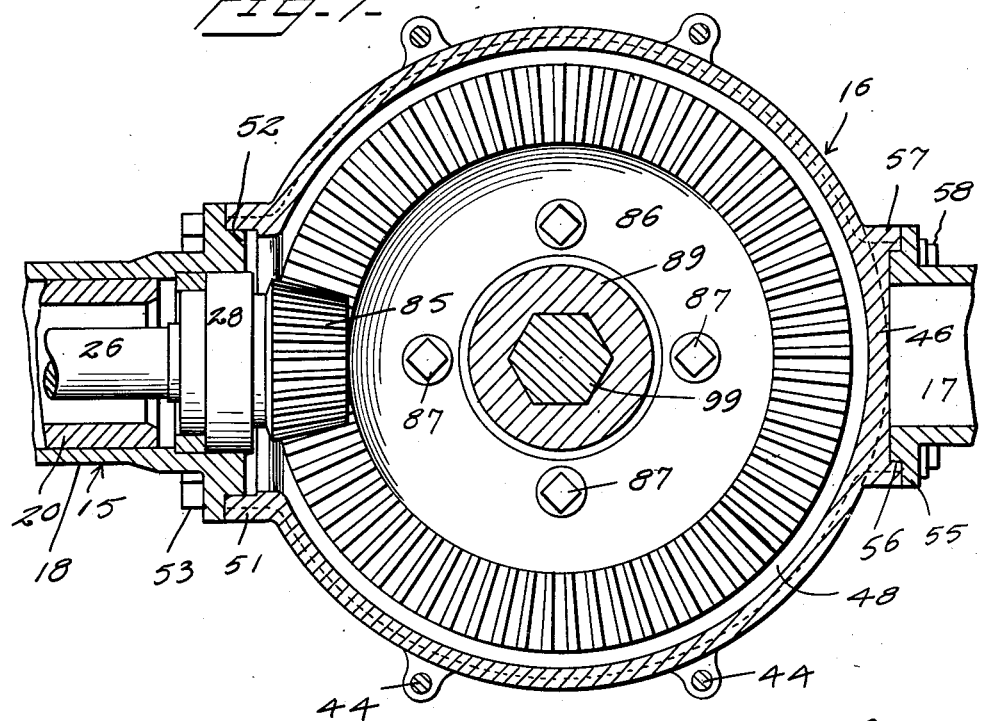
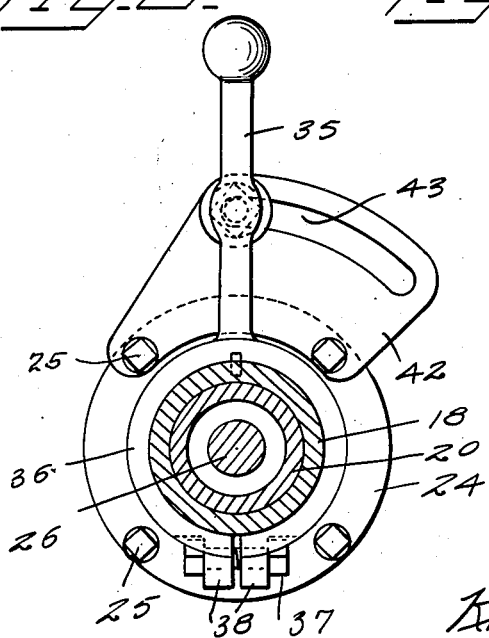
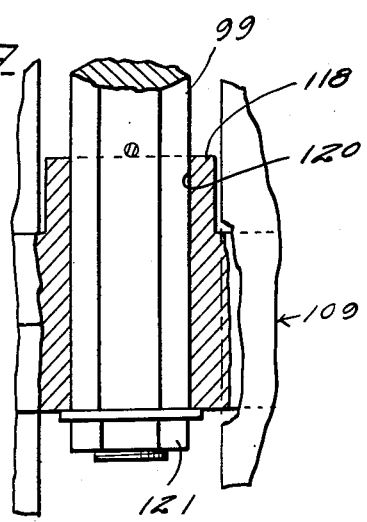
INVENTOR.
E. L. Rose
BY Kimmel & Crowell Attys.

Dec. 5, 1950  E. L. ROSE  2,532,424
ROTARY PLOW
Filed April 30, 1945  6 Sheets-Sheet 6
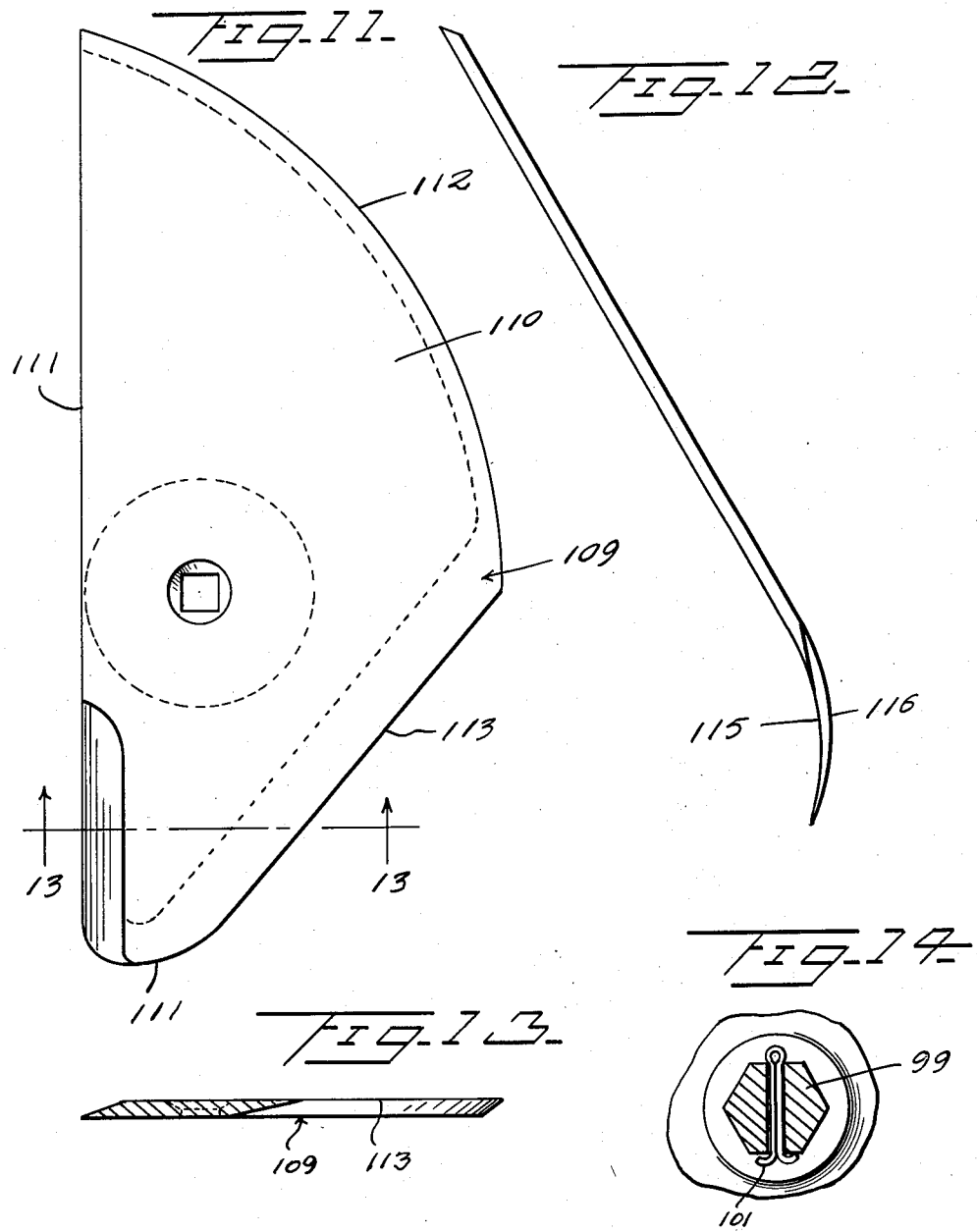
INVENTOR.
E. L. Rose
BY
Kimmel & Crowell Attys.

Patented Dec. 5, 1950

2,532,424

UNITED STATES PATENT OFFICE 2,532,424

ROTARY PLOW

Eustace Loring Rose, Charleston, W. Va., assignor to Gravely Motor Plow & Cultivator Company, Dunbar, W. Va.

Application April 30, 1945, Serial No. 590,994

13 Claims. (Cl. 97—43)

This invention relates to rotary plows.

An object of this invention is to provide as an attachment for a power means a rotary plow and operating means therefor.

Another object of this invention is to provide a rotary plow construction including a plow member formed of a plurality of spirally arranged plow blades secured to a vertically adjustable shaft with the vertical shaft operatively coupled to a horizontal drive shaft.

A further object of this invention is to provide a rotary plow construction which will permit angular adjustment of the plow.

A further object of this invention is to provide in combination with a plow of this type, an adjustable shield which serves as a spreader for spreading the dirt laterally of the movement of the plow, the degree of spreading depending upon the position of the shield.

A further object of this invention is to provide a plow construction wherein the plow shaft may be disposed in a vertical position or at an angle to the vertical with the guiding wheels and axle therefor disposed on the same or different angle so that if desired one wheel of the guiding wheels may be disposed in a furrow of the plowed ground whereas the other wheel may move over the unplowed ground.

A further object of this invention is to provide a rotary plow structure wherein the soil will be pulverized by the rotary blades and will be discharged laterally of the movement of the plow in an even manner so that a smooth surface will be provided, thereby eliminating subsequent harrowing and/or raking of the ground.

To the foregoing objects and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 1 is a detail front elevation of a rotary plow construction embodying this invention, Figure 2 is a detail side elevation partly broken away of the device, Figure 3 is a fragmentary longitudinal section of the device, Figure 4 is a fragmentary longitudinal section of the forward portion of the device, Figure 5 is a fragmentary sectional view taken on the line 5—5 of Figure 4, Figure 6 is a fragmentary sectional view taken on the line 6—6 of Figure 4, Figure 7 is a fragmentary sectional view taken on the line 7—7 of Figure 3, Figure 8 is a sectional view taken on the line 8—8 of Figure 2, Figure 9 is a fragmentary sectional view of the plow blade support and shaft, Figure 10 is a bottom plan of the plow blade assembly, Figure 11 is a plan view of one of the plow blades, Figure 12 is an end elevation of the plow blade, Figure 13 is a sectional view taken on the line 13—13 of Figure 11, and Figure 14 is a fragmentary sectional view taken on the line 14—14 of Figure 3.

Referring to the drawings the numerals 15, 16 and 17 designate a hollow housing assembly, the numeral 15 comprising a rear tubular housing, the numeral 16 designating an intermediate gear housing and the numeral 17 designating a front tubular supporting housing which is in axial alignment with the rear housing 15.

The rear housing 15 comprises an outer tubular member 18 which has formed integral with the forward end thereof a flange 19. An inner sleeve 20 is loosely disposed within the outer housing 18 and includes a rear annular enlargement 21 forming a shoulder 22 against which the rear end of the housing or sleeve 18 is adapted to engage. The enlargement 21 is formed at its rear end with a flange 23 having an annular rabbet 24 by means of which fastening bolts 25 extending through the flange 23 may secure the housing 15 to a prime mover or power device. A drive shaft 26 is rotatably disposed within the sleeve 20 being rotatably supported in the sleeve 20 by means of a rear anti-friction bearing 27 and a forward anti-friction bearing 28. The rear end of the shaft 26 is formed with longitudinal splines 29 on which the bushing 30 of a toothed coupling 31 is secured by means of a nut 32, which is threaded on the rear end of the shaft 26. A rear packing member 33 is disposed about shaft 26 forwardly of the anti-friction bearing 27 and a forward packing or sealing member 34 is mounted about the forward portion of the shaft 26 inwardly of the bearing 28.

The outer sleeve 18 is adapted to be circumferentially adjusted with respect to the inner sleeve 20 by means of a sleeve adjusting lever or arm 35, which is formed with a split ring 36 engaging about the rear portion of the sleeve 18. The split ring 36 is firmly secured with respect to the sleeve 18 by means of a clamping bolt 37 engaging through a pair of ears 38 carried by the split ring 36 and a segmental key 39 engages in complementary key-way carried by the split ring 36 and the outer sleeve 18. The lever or arm 35 has a rearwardly projecting lug 40 extending therefrom in which a lever clamping bolt or screw 41 is threaded.

A plate 42 is fixed to the forward side of the flange 23 by a pair of the fastening members 25 and is formed with an arcuate slot 43 through which the bolt or screw 41 engages. When lever 35 has been rocked to the desired position this lever is then locked in its adjusted position by tightening of the bolt or screw 41.

The gear housing 16 includes complementary upper and lower housing members, which are secured together by means of bolts 44. The upper gear housing member comprises a top wall 45 and a circular side wall or flange 46, which is formed with a rabbet 47 at its lower end. The lower half of the gear housing comprises a bottom wall 48 having an annular side wall or flange 49 which is also formed with a rabbet 50, so that the two flanges 46 and 49 may be locked together. The rear end of the gear housing 16 is formed with an annular bushing 51 within which the rabbeted forward end 52 of the flange 19 is adapted to be secured by fastening members 53.

The forward tubular housing 17 comprises an elongated tubular member 54 having an annular flange 55 at the rear thereof, which is formed with a rabbet 56 engaging with an annular flange 57 carried by the forward end of the gear housing 16. The flange 55 is firmly secured with respect to the flange 57 by means of fastening members 58. The forward end of the tubular member 54 is provided with a reduced diameter extension 59 having an annular flange 60 at the forward end thereof and forming a rear shoulder 61. A split clamping sleeve 62, which is formed of an upper semi-cylindrical sleeve member 63 and a lower semi-cylindrical sleeve member 64 engages about the reduced member 59 and the complementary clamping members 63 and 64 are formed with opposed pairs of ears 65 and 66 respectively, which are secured together by means of bolts 67. The supporting sleeve 62 may be either tightly or loosely mounted on the reduced extension 59. An upwardly extending plate 68, which is braced by a bracing web 69 is carried by the upper member 63 and the plate 68 engages between a pair of vertically disposed ribs 70, which are carried by a vertically disposed plate 71. The plate 71 is formed with an elongated slot 72 through which a clamping bolt 73 loosely engages, the bolt 73 being threaded into the plate 68.

The bolt 73 is formed with a polygonal head 74 and a washer 75 is interposed between the head 74 and the forward side of the plate 71. The supporting plate 71 is formed at its upper end with a forwardly extending flange 76 which serves as a reinforcing means for the upper end of the plate 71. The head 74 of the bolt 73 is provided with an opening 77 therethrough and a bar 78 loosely engages through the hole 77 and is provided at the opposite ends thereof with knobs 79. The bar 78 provides a means whereby the bolt 73 may be readily turned to either clamping or released position.

The lower end of the plate 71 is provided with a transversely extending groove or channel 80 within which an axle 81 for a pair of wheels 82 is adapted to engage. The axle 81 is tightly secured in the channel 80 by means of a clamping plate 83, which is held in clamping position by means of a pair of fastening members 84 threaded into the lower portion of the plate 71. By means of the clamping plate 83 the axle 81 may be endwise adjusted to the desired position. Normally the clamping plate 83 will engage the center of the axle or shaft 81, but if desired this axle or shaft may be shifted endwise to provide for a short portion of the shaft at one side of the plate 71 and a longer portion on the opposite side or edge thereof. The provision of the clamping bolt 73 provides a means whereby the forward end of the housing 17 may be vertically adjusted with respect to the shaft or axle 81 and the wheels 82 so as to position the plow assembly, to be hereinafter described, at the desired position with respect to the ground.

The drive shaft 26 has secured to the forward end thereof a bevelled pinion or driving gear 85, which meshes with a larger gear 86. The gear 86 is fixed by means of fastening members 87 to the annular flange 88 of a bushing or hub 89 rotatably disposed in the housing 16. The bushing 89 is provided with a reduced diameter upper portion 90 extending upwardly through the top wall 45 of the housing 16 and an anti-friction bearing 91 engages about the reduced diameter portion 90 and is positioned in an annular enlargement 92 carried by the central portion of the top wall 45. A sealing cap 93 having a flange 94, which is secured by fastening members 95 to the top wall 45 engages about the stud or reduced diameter portion 90 of the hub 89 and a sealing member 96 is mounted within the cap 93. The sealing member 96 is U-shaped in transverse section having the bight thereof uppermost and a second sealing washer 97 is interposed between the sealing member 96 and the upper wall of the cap 93. The hub 89 is formed with a polygonal bore 98 through which a polygonal shaft 99 loosely engages.

The shaft 99 constitutes the plow blade supporting shaft and is provided with a plurality of holes 100, through which a cotter pin or shaft adjusting member 101 is adapted to engage for supporting the shaft 99 in the desired adjusted position with respect to the hub 89. The hub 89 also includes a lower stud shaft 102, which extends through the bottom wall 48 and an anti-friction bearing 103 engages about the stud shaft 102. A cap 104 having a flange 105, which is secured by fastening members 106 to the bottom wall 48, engages about the shaft 99 and bears against the anti-friction bearing 103. A sealing member 107 is disposed within the cap 104 being U-shaped in transverse section and a second sealing ring 108 is interposed between the bight of the sealing member 107 and the lower wall of the cap 104.

The shaft 99 has secured to the lower end thereof a plow blade structure including a plurality of plow blades generally designated as 109. The blades 109, which are shown in detail in Figures 11, 12 and 13, include a plate 110, which is formed with an inner straight edge 111, an outer convex edge 112 and a lower straight edge 113. The lower edge 113 merges with the lower end of the straight edge 111 on a convex curvature 114 and the edges 112, 113, 114 may be bevelled so as to provide for the desired cutting of the ground as the blades are rotated. The pointed end formed by the junction of the vertical edge 111 and the lower edge 113 is formed with an upper or inner concave curvature 115 and an outer convex curvature 116. The lower portion of edge 111 and portion 114 is beveled oppositely with respect to edges 112, 113 and 114. In the present instance, there are four of these blades 109, which are secured to radially arranged arms 117 carried by a hub 118. The blades 109 are mounted on an angle to the length of the shaft 99, as shown more clearly in Figure 2.

The spider formed by the hub 118 and the arms 117 is provided with a polygonal bore 120 through which the shaft 99 loosely engages and a clamping nut 121 is threaded on the lower end of the shaft 99 and tightly holds hub 118 on shaft 99.

During the rotation of the plow blades 109 the dirt will be thrown upwardly and laterally and this flying dirt may be guided or distributed by means of a curved shield 122 having a lug 123 carried by the inner end thereof which is secured by a fastening member 124 to an ear 125 carried by one side of the gear housing 16. The shield or deflector 122 can be angularly adjusted with respect to the plow blade assembly, so that the dirt loosened by the plow blade assembly will be deflected for the desired distance laterally of the movement of the device.

In the use of this device, which is formed as an attachment for a prime mover or power device such as a tractor which may be a hand tractor or otherwise, the housing 15 is secured to the forward end of the prime mover by the fastening members 25. During normal operation of the device, the housing 15 with the housing 16 may be angularly adjusted with respect to the vertical, so that the lower edges 113 of the plow blades will be substantially horizontal. After the first furrow has been made, the wheel assembly will assume the position shown in Figure 1 with one wheel engaging in the furrow and the other wheel on the unplowed surface. Rotation of the drive shaft 26 will effect rotation of the plow shaft 99, the latter rotating clockwise and as the plow blades rotate, the dirt loosened thereby will be thrown upwardly at one side of the movement of the device and this loosened flying dirt may be distributed over the desired area laterally of the furrow, which is being made by the plow assembly by adjustment of the shield or distributor 122.

Preferably the wheel assembly is swivelly mounted on the forward end of the forward housing 17 at sleeve 63 so that the wheel assembly may assume any angle with respect to the horizontal independently of the angle which is assumed by the plow blade assembly.

What I claim is:

1. A rotary plow attachment comprising a rear tubular housing, an intermediate gear housing, a forward tubular supporting housing, a drive shaft in said rear housing, a plow shaft carried by said gear housing at right angles to said drive shaft, a gear connection between said drive and plow shafts, an upright plate at the forward end of said forward housing, a coupling member rotatably carried by said forward housing, means securing said coupling member to said plate, an axle carried by said plate, and wheels carried by said axle.

2. A rotary plow attachment as set forth in claim 1 wherein said securing means is adjustable lengthwise of said plate.

3. A rotary plow attachment as set forth in claim 1 wherein said coupling member includes a sleeve rotatably carried by said forward housing and a plate disposed at right angles to the bore of said sleeve.

4. A rotary plow attachment as set forth in claim 1 wherein said rear housing includes an outer sleeve and an inner sleeve, and means for circumferentially adjusting said sleeves relative to each other so as to thereby adjust the angular position of said plow shaft relative to the vertical.

5. A rotary plow attachment comprising a rear tubular housing, an intermediate gear housing, a horizontal supporting member extending forwardly from said gear housing and aligning with said rear housing, a drive shaft rotatable in said rear housing, a plow shaft carried by said gear housing at right angles to said drive shaft, a gear connection between said drive and plow shafts, a traction means at the forward end of said supporting member, a sleeve rotatably carried by said horizontal supporting member having a forwardly extending clamp, and a vertically extending support member carried by the traction means and in engagement with said clamp for adjustably securing said sleeve to said traction means whereby said horizontal supporting member may be vertically adjusted.

6. A rotary plow attachment comprising a rear tubular housing, an intermediate gear housing, a supporting member extending forwardly from said gear housing and aligning with said rear housing, a drive shaft rotatable in said rear housing, a plow shaft carried by said gear housing at right angles to said drive shaft, a gear connection between said drive and plow shafts, a traction means at the forward end of said supporting member, a sleeve rotatably carried by said supporting member, an upstanding plate carried by said sleeve, a second upstanding plate carried by said traction means, vertical guide means carried by said second plate between which said first named plate engages, and means adjustably locking said first plate relative to said second plate.

7. A rotary plow attachment comprising a rear tubular housing, an intermediate gear housing, a supporting member extending forwardly from said gear housing and aligning with said rear housing, a drive shaft rotatable in said rear housing, a plow shaft carried by said gear housing, at right angles to said drive shaft, a gear connection between said drive and plow shafts, a traction means at the forward end of said supporting member, a sleeve rotatably carried by said supporting member, a vertical member releasably secured to the sleeve and carried by the traction means for adjustably securing said sleeve to said traction means whereby said supporting member may be vertically adjusted, a rear sleeve loosely disposed in said rear housing, means for securing said rear sleeve to a power means, and a clamp engageable between the rear housing and rear sleeve for adjustably locking said rear housing in circumferentially adjusted position relative to said rear sleeve.

8. A rotary plow attachment comprising a horizontal tubular housing having a plurality of sleeves, a drive shaft journalled in the housing, a plow shaft journalled in the housing normal to the drive shaft, operative drive connections between said shafts, a transporting carriage having an axle, a vertical support member carried by said axle with said housing adjustably secured thereto and a circumferential clamp carried by the sleeves of said housing for releasable engagement therebetween to adjust the housing and plow shaft angularly on a horizontal axis.

9. A rotary plow attachment comprising a horizontal tubular housing, a drive shaft journalled in the housing, a plow shaft journalled in the housing normal to the drive shaft, operative drive connections between said shafts, a transporting carriage having an axle, a support carried by the axle, said support being formed with a vertical slot extending upwardly of the axle and a horizontally movable clamp in engagement with said axle for laterally and vertically adjusting the housing, means to couple the drive shaft to a prime mover and a rotatable coupling carried by the housing for adjustment of said housing and plow shaft therewith angularly on the drive shaft as an axis.

10. A rotary plow attachment comprising a rear tubular housing, an intermediate gear housing fixed to the rear housing, a supporting member fixed to and extending forwardly from said gear housing and aligning with said rear housing, a drive shaft rotatable in said rear housing, a plow shaft carried by said gear housing at right angles to said drive shaft, a gear connection between said drive and plow shafts, a traction means at the forward end of said supporting member, a sleeve rotatably carried by said supporting member, and a slotted support carried by the traction means with said sleeve in releasable engagement with said slot for adjustably securing said sleeve to said traction means whereby said supporting member may be vertically adjusted or angularly adjusted laterally.

11. A rotary plow attachment comprising a rear tubular housing, an intermediate gear housing rigid with the rear housing, a supporting member rigid with and extending forwardly from said gear housing and aligning with said rear housing, a drive shaft rotatable in said rear housing, means to operatively connect the drive shaft to a tractor, a plow shaft carried by said gear housing at right angles to said drive shaft, a gear connection between said drive and plow shafts, a traction means at the forward end of said supporting member, a sleeve rotatably carried by said supporting member, an upstanding plate carried by said sleeve, a second upstanding plate carried by said traction means, vertical guide means carried by said second plate between which said first named plate engages, and means adjustably locking said first plate relative to said second plate.

12. A rotary plow attachment for a tractor comprising a rear tubular housing, an intermediate gear housing, a supporting member extending forwardly from said gear housing and aligning with said rear housing, a drive shaft rotatable in said rear housing, means to connect the rear housing to the gear housing, means to couple the drive shaft to the power means of the tractor, a plow shaft carried by said gear housing, at right angles to said drive shaft, means between the connecting means and rear housing to angularly adjust the latter on the drive shaft as an axis, a gear connection between said drive and plow shafts, a traction means at the forward end of said supporting member, a sleeve rotatably carried by said supporting member, a vertically slotted plate adjustably secured to the traction means with the sleeve boltingly secured to said slotted plate for adjustably securing said sleeve to said traction means whereby said supporting member may be vertically adjusted, a rear sleeve loosely disposed in said rear housing, means for securing said rear sleeve to a tractor, and means adjustably locking said rear housing and plow shaft in circumferentially adjusted position relative to said rear sleeve.

13. A rotary plow comprising a horizontal housing, a horizontal drive means in the housing, a vertical plow shaft, a vertical sleeve rotatable in the housing, operating means connecting said drive means with said sleeve, said plow shaft being shiftable in the sleeve, a transversely extending stop carried by the plow shaft and longitudinally adjustable thereon to adjust the shiftable position of the plow shaft in the sleeve and a clamping sleeve carried by the housing for adjusting the housing angularly.

EUSTACE LORING ROSE.

REFERENCES CITED

The following references are of record in the file of this patent:

UNITED STATES PATENTS

| Number | Name | Date |
|---|---|---|
| 78,400 | Standish | May 26, 1868 |
| 258,046 | Fogarty | May 16, 1882 |
| 330,452 | Wittram | Nov. 17, 1885 |
| 704,857 | Castelin | July 15, 1902 |
| 768,106 | Williams | Aug. 23, 1904 |
| 1,208,856 | Storey | Dec. 19, 1916 |
| 1,569,962 | Biggers | Jan. 19, 1926 |
| 1,605,707 | Carpenter | Nov. 2, 1926 |
| 1,773,672 | Grim | Aug. 19, 1930 |
| 2,050,120 | Pizarro | Aug. 4, 1936 |
| 2,279,652 | Beard | Apr. 14, 1942 |